2,957,000
PROCESS OF DEHYDROGENATING COMPOUNDS OF THE RESERPINE SERIES

Robert Joly, Montmorency, and Robert Bucourt, Villiers-le-Bel, France, assignors to Les Laboratoires Francais de Chimiotherapie, Paris, France, a corporation of France No Drawing. Filed Apr. 16, 1959, Ser. No. 806,768

Claims priority, application France Apr. 24, 1958

4 Claims. (Cl. 260—287)

The present invention relates to a process of converting 3α-isomers of compounds of the reserpine series into the corresponding 3,4-dehydro derivatives.

In co-pending patent application Serial No. 727,776, filed April 11, 1958, now U.S. Patent No. 2,924,600, applicants have described a process of preparing alkaloids of the reserpine series from their 3,4-dehydro derivatives by reduction by means of zinc and perchloric acid in the presence of a solvent miscible with water or of a mixture of such solvents. This stereospecific reduction process which produces the desired 3β-isomer in a yield of about 80% takes place as one of the final steps of the synthesis of reserpine compounds. Attempts have been made to reconvert the 3α-isomer which is obtained in this reaction step as a by-product, into the corresponding 3,4-dehydro compound which is again subjected to stereospecific reduction yielding 80% of the 3β-isomer. Such a dehydrogenation process is the process suggested by Weisenborn and Diassi (J. Am. Chem. Soc., vol. 78, 1956, page 2022). Said process consists in treating the physiologically inactive 3α-isomer with mercuric acetate. However, the use of a mercury salt is highly disadvantageous in the production of a compound to be employed in therapy because the last traces of mercury must carefully be eliminated, for instance, in the form of its sulfide. This procedure necessitates additional operations and, in general, yields a slightly colored final product containing resins.

It is one object of the present invention to provide a simple and effective process of converting 3α-isomers of compounds of the reserpine series into the corresponding 3,4-dehydro derivatives which process is free of the disadvantages of the known dehydrogenation processes.

Other objects of the present invention and advantageous features thereof will become apparent as the description proceeds.

In principle, the process according to the present invention consists in dehydrogenating the 3α-isomers of compounds of the reserpine series to the corresponding 3,4-dehydro derivatives by subjecting them to the action of palladium black in acetic acid in the absence of air. Since the reaction takes place in the absence of air, the palladium black prepared under conditions in which it is generally used for hydrogenation, acts in a unique manner as a dehydrogenating agent and not as an oxidation catalyst. The reaction proceeds most favorably at elevated temperatures while using from 0.5% to 2% of palladium black calculated for the product to be dehydrogenated. When dehydrogenation is completed, the reaction mixture is cooled, diluted with water, and the palladium black filtered off. The resulting 3,4-dehydro compound is precipitated in the form of its crude perchlorate and is subjected without further purification to reduction by means of zinc and perchloric acid in order to convert it into the desired 3β-reserpine compound. The yield of crude perchlorate of the 3,4-dehydro compound corresponds generally to the theoretical yield. It contains about 65–70% of the 3,4-dehydro compound which may be reduced to the 3β-epimer. The process of the present invention thus provides an easy means of recovering an additional quantity of the physiologically active 3β-epimer.

The following example describing the conversion of isoreserpine into 3,4-dehydroreserpine illustrates the present invention without, however, limiting the same thereto. The process may be used in the same fashion in the conversion of other related compounds, such as isodeserpidine, isorescinnamine, and others, to their corresponding 3,4-dehydro derivatives. Said isoreserpine and related compounds are recovered as by-product from the mother liquors of the reduction step in which the corresponding 3,4-dehydro compounds are reduced by means of zinc and perchloric acid described in the co-pending patent application mentioned hereinabove.

EXAMPLE

*Conversion of isoreserpine into 3,4-dehydroreserpine*

7 cc. of a solution of palladium chloride, containing 0.2 g. of palladium per 100 cc., in acetic acid containing 1% of water are added to 140 mg. of dried carbon black. 43 cc. of acetic acid are admixed thereto. Air is expelled from the reaction flask by a stream of hydrogen and the mixture is then stirred in a hydrogen atmosphere for 20 minutes. Thereafter, the hydrogen is replaced by a stream of nitrogen. 10 g. of isoreserpine, recovered according to the process described in the above mentioned co-pending patent application are introduced into the mixture along with 50 cc. of acetic acid. The mixture is refluxed for about 1½ hours while nitrogen is being bubbled through. After cooling to room temperature, 100 cc. of a mixture of ice and water are added and after further cooling the palladium black is filtered off and washed with acetic acid containing 50% water. The wash liquors are combined with the filtrate and 1000 cc. of ice water, 20 cc. of perchloric acid, and 100 cc. of acetone are added while stirring. Stirring is continued for a few minutes after said addition. The reaction mixture is filtered and the filter residue is washed with water. The resulting compound may be reduced without further purification by means of zinc and perchloric acid in order to convert it into reserpine.

The crude perchlorate of 3,4-dehydroreserpine is dried in a vacuum. 11.4 g. to 11.6 g., corresponding to a yield of 98% to 100% are obtained. Optical rotation $[\alpha]_D^{20} = -126° \pm 1.5°$ (concentration: 1% in tetrahydrofuran containing 55% of water). Spectrographic analysis shows that it contains 65% of the perchlorate, of 3,4-dehydroreserpine.

The following 3α-reserpine compounds and others can also be subjected to the dehydrogenation process according to the present invention. Such compounds are obtained as by-products when producing a number of substituted deserpidine compounds according to the process described in detail in co-pending, commonly-assigned patent application Serial No. 727,777, filed April 11, 1958. Compounds of this type are:

10-methoxy isodeserpidine.
12-methoxy isodeserpidine.
9,10-dimethoxy isodeserpidine.
10-chloro isodeserpidine.
11-chloro isodeserpidine.
12-chloro isodeserpidine.
9,12-dichloro isodeserpidine.
11,12-dichloro isodeserpidine.
9-chloro-12-methoxy isodeserpidine.
10-chloro isoreserpine.
11-chloro-12-methoxy isodeserpidine.
12-chloro isoreserpine.

11-methyl isodeserpidine.
12-methyl isodeserpidine.
6-ethyl-isoreserpine, and others.

The procedure to be followed is substantially the same as described in the preceding example. The process disclosed in copending application Serial No. 727,777 consists in principle in the following reaction steps.

(a) Tryptamine which may be substituted in its aromatic ring and/or in its amino alkyl sidechain by chlorine, the lower alkoxy group, or a lower alkyl radical is condensed in a neutral solvent, such as methylene chloride, with the dextrorotatory methyl ester of 1β-carboxy methyl-2β-methoxy carbonyl-3α-methoxy-4β-acetoxy-6β-formyl cyclohexane.

(b) The resulting condensation product is subjected to the action of potassium borohydride in a lower alkanol, such as methanol.

(c) The cyclized and reduced 3-oxo-2,3-seco-20α-yohimbane compound obtained thereby is esterified in 18-position by means of 3,4,5-trimethoxy benzoic acid anhydride or other anhydrides of acids forming therapeutically useful 18-esters.

(d) Said ester is heated with phosphorus oxychloride to cause ring closure to the corresponding 3,4-dehydro yohimbane compound such as dehydroreserpine and the like, which is then (e) reduced by means of zinc in the presence of perchloric acid and in a water-miscible solvent, such as acetone or tetrahydrofuran.

The resulting 3β-reserpine and the like compound is separated from its 3α-isomer which is reconverted and, thus reused by dehydrogenation according to the process of this invention to the corresponding 3,4-dehydroyohimbane compound.

We claim:
1. In the process of converting the 3α-isomeric compounds of the reserpine series into the corresponding 3,4-dehydro compounds, the steps which comprise heating to reflux the 3α-isomeric compound of the reserpine series in acetic acid in the absence of air and in an inert gas atmosphere with palladium black until dehydrogenation is substantially completed, adding perchloric acid and a water-miscible organic solvent to the dehydrogenation mixture diluted with water, removing the catalyst by filtration, and isolating the precipitated perchlorate of the corresponding 3,4-dehydro compound of the reserpine series.

2. The process according to claim 1, wherein the inert gas is nitrogen.

3. The process according to claim 1, wherein the water-miscible organic solvent is acetone.

4. The process according to claim 1, wherein dehydrogenation is effected by heating under reflux in a nitrogen atmosphere.

References Cited in the file of this patent

Kaneko: J. Org. Chem., vol. 23, pp. 1970–1973 (1958).
Julian et al.: J. Am. Chem. Soc., vol. 71, pp. 3207–3210 (1949).
Wenkert: J. Am. Chem. Soc., vol. 79, pp. 1519–1520 (1957).